April 21, 1964  A. KRANTZ  3,129,708
INTRA-DERMIC INJECTOR
Filed Sept. 26, 1960

INVENTOR.
ALFRED KRANTZ
BY
RICHEY, MCNENNY & FARRINGTON
R. H. Dickinson Jr.
ATTORNEYS

United States Patent Office 3,129,708
Patented Apr. 21, 1964

3,129,708
INTRA-DERMIC INJECTOR
Alfred Krantz, 3 Rue Faget-de-Baure, Pau, France
Filed Sept. 26, 1960, Ser. No. 58,532
Claims priority, application France Sept. 26, 1959
1 Claim. (Cl. 128—173)

The present invention relates to an intra-dermic injector containing injecting liquid in a reservoir, part of this liquid being withdrawn at each injection.

The object of the invention is to permit at each injection the introduction into the reservoir of a certain quantity of air, to fill up the partial vacuum created in the reservoir.

The invention has another purpose, namely, to prevent scattered discharges of liquid around the injection point, when injecting.

Figure 1:
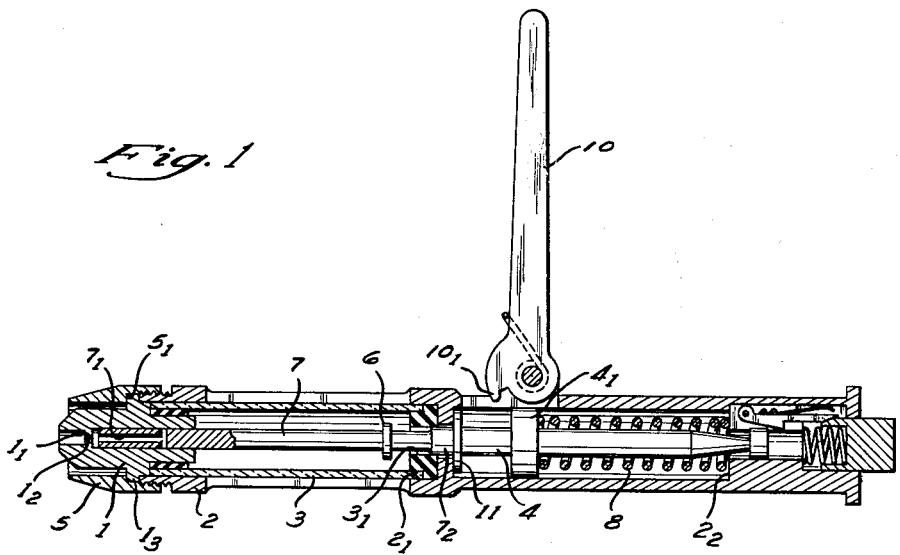
Figure 2:
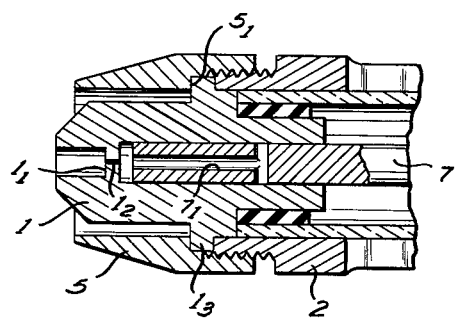

An injector according to the invention is shown by way of non-restrictive example in the attached figures in which FIGURE 1 is a longitudinal cross-sectional view of the injector and FIGURE 2 is an enlarged fragmentary cross-sectional view of the forward end of the injector of FIGURE 1.

The injector according to the invention consists of a body 2 with a cylindrical reservoir 3 inside it containing the injection liquid and surrounding a piston 7 which moves in a cylinder $1_1$ placed in an element I forming the head of the injector.

The end of the cylinder $1_1$ is drilled with an injection orifice $1_2$ of very small section.

The cylinder $1_1$ is able to be put into communication with the reservoir 3 by means of a duct $7_1$ pierced in a piston 7.

This duct $7_1$ has a longitudinal T-shaped section, so that when the piston 7 is in the rear position, the cross arm of the T of the duct $7_1$ is open to the liquid of the reservoir 3 which enters it, passes into the longitudinal arm of the T and reaches the cylinder $1_1$.

When the piston is in the forward position, the orifices This duct $7_1$ has a longitudinal T-shaped section, so that when the piston 7 is in the rear position, the cross arm of the T of the duct $7_1$ is open to the liquid of the reservoir 3 which enters it, passes into the longitudinal arm of the T and reaches the cylinder $1_1$.

When the piston is in the forward position, the orifices of the cross arm of the T of the duct $7_1$ are facing the internal wall of the head 1 and are thus closed. The orifice $1_2$ of the cylinder $1_1$ has a very small area as compared to that of the duct $7_1$ in the piston 7, so that the retraction of the piston creates a vacuum in the interior of the duct to allow it to be refilled with liquid from the reservoir.

The reservoir 3 is made of transparent material so that the quantity of liquid contained can be ascertained.

Moreover, this reservoir 3 is removable. To this end, it is simply engaged by sliding into a bore $2_1$ provided in the body 2 of the injector and abuts in front against the face of a small collar $1_3$ provided on the head 1.

This head 1 is itself made integral with the apparatus by a nut 5 which screws on to the body 2 of the injector and comprises internally a shoulder piece $5_1$ forming an abutment for the small collar $1_3$.

This nut 5 also acts as a protecting sleeve against scattered discharges of liquid.

The piston is extended at the rear by a rod 4 used for operating it.

The piston 7 traverses the rear face of the reservoir 3 through a duct $3_1$ drilled in this face.

The fluid-tightness of the passage of the piston 7 is effected:

On the one hand, by a small collar 6 provided on the piston 7 and pressing against the rear face of the reservoir 3 while closing the annular space existing between the piston 7 and the duct $3_1$ (the piston 7 in this case being at the entrance to the cylinder).

On the other hand, by an expansion $7_2$ of the piston 7, this expansion fitting exactly on the duct $3_1$ (the piston 7 in this case being at the end of the cylinder).

This arrangement permits the introduction in reservoir 3, at the time of each injection, of a certain quantity of air to replace the injected liquid and thus fill up the partial vacuum created in reservoir 3 by such injection. The air can enter into reservoir 3, during the projection or the retraction of piston 7, through the annular space 31 arranged between the rearward opening in the cylinder 3 and piston 7. This annular space 31 results from the fact that the opening made in the rearward portion of cylinder 3 for the passage of piston 7 is of a greater diameter than that of the part of piston 7 enclosed between the wall collar 6 and the enlargement $7_2$.

The rod 4 comprises a small collar $4_1$ against which a spring 8 presses contained in a body 2 of the injector and bearing, on the other hand, against a shoulder piece $2_2$ of said body 2.

A lever 10 is added to the apparatus and comprises a notch $10_1$ which acts against the small collar $4_1$ by opposing the action of the spring 8.

An injector of the kind operates in the following manner:

(1) *Triggering*

The piston 7 is in the rear position and held by the lever 10.

The cylinder $1_1$ communicating with the reservoir 3 by means of the duct, fills with liquid.

(2) *Injection*

The lever 10 is moved over (from left to right in the case of the figure) which releases the piston 7 which, under the action of the spring 8 exerts a powerful thrust —which is also sudden—on the liquid, which escapes through the orifice $1_2$ in the form of a very fine jet and at great pressure.

What I claim is:

An intra-dermic injector havig a fluid reservoir, a head portion at the forward end of said fluid reservoir, said head portion containing an injection cylinder, said head portion having an orifice nozzle at the forward end of said injection cylinder, a piston axially slidable within said cylinder between forward and rearward positions, said piston extending rearwardly through said reservoir, duct means within said piston adapted to admit the fluid from said reservoir to said cylinder when said piston is in the rearward position, said duct means being closed when said piston is moved to the forward position to force fluid within said injection cylinder through said orifice nozzle, an opening in the rearward wall of said reservoir adapted to receive the rearward extension of said piston therethrough, said opening having a diameter greater than that of said piston to provide a passage for air from the exterior into said reservoir, seal means spaced along the rearward extension of said piston to alternately close said opening when said piston is in the forward position and in the rearward position, spring means adapted to force said piston from the rearward position to the forward position, and means to retract said piston from the forward position to the rearward position against said spring means.

References Cited in the file of this patent

UNITED STATES PATENTS

| | | |
|---|---|---|
| 201,628 | Peters | Mar. 26, 1878 |
| 846,032 | Keller | Mar. 5, 1907 |
| 2,324,535 | Powell | July 20, 1943 |
| 2,380,534 | Lockhart | July 31, 1945 |
| 2,512,882 | Truesdale | June 27, 1950 |
| 2,669,230 | Smoot | Feb. 16, 1954 |
| 2,705,953 | Potez | Apr. 12, 1955 |